United States Patent [19]
Kotyza et al.

[11] 4,167,198
[45] Sep. 11, 1979

[54] OVERPRESSURE VALVE FOR A HYDRAULIC PIT PROP

[75] Inventors: Heinrich Kotyza; Harri Heinze, both of Salzgitter, Fed. Rep. of Germany

[73] Assignee: Salzgitter Maschinen Aktiengesellschaft, Salzgitter, Fed. Rep. of Germany

[21] Appl. No.: 769,368

[22] Filed: Feb. 17, 1977

[51] Int. Cl.² .............................................. F16K 17/02
[52] U.S. Cl. .................................................. 137/528
[58] Field of Search ................ 137/528, 529; 267/122, 267/123

[56] References Cited
U.S. PATENT DOCUMENTS

| 1,901,740 | 3/1933 | Feeley | 137/529 X |
| 2,509,839 | 5/1950 | Panner | 137/528 X |
| 2,556,867 | 6/1951 | Carlisle | 137/529 X |
| 2,911,999 | 11/1959 | Lamb | 137/528 X |

FOREIGN PATENT DOCUMENTS 1450558  12/1968  Fed. Rep. of Germany ........... 137/528

Primary Examiner—Robert G. Nilson
Attorney, Agent, or Firm—Michael J. Striker

[57] ABSTRACT

An overpressure valve for a hydraulic pit prop comprises a housing, a valve seat provided in the housing, a valve body movable in axial direction in the housing between a closed position engaging the valve seat and an open position, and bellows means filled with a gas under pressure arranged for biasing the valve body to the closed position.

22 Claims, 7 Drawing Figures

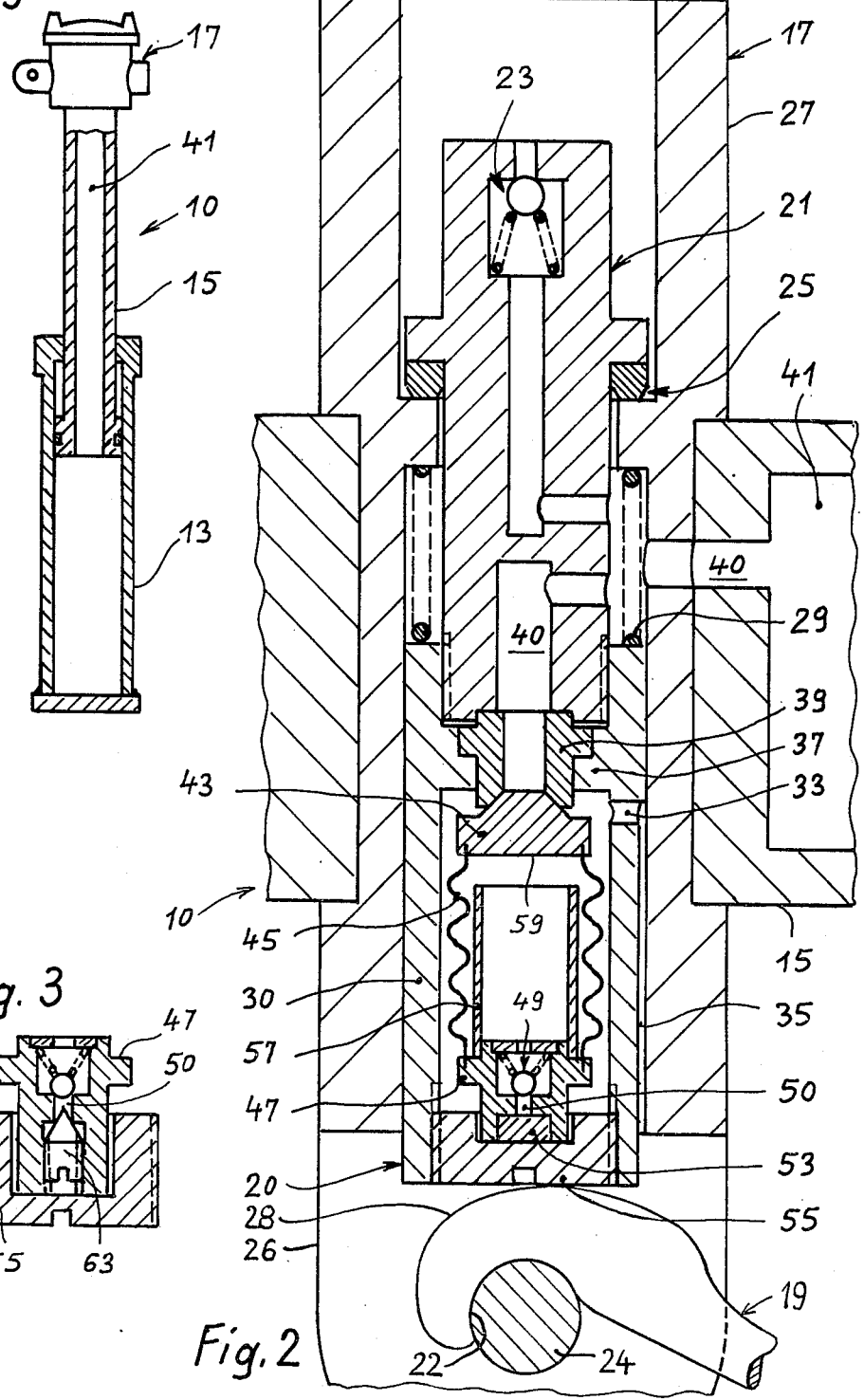
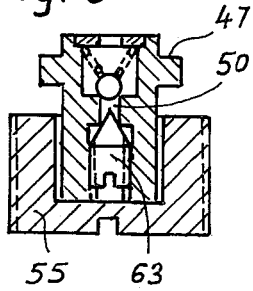

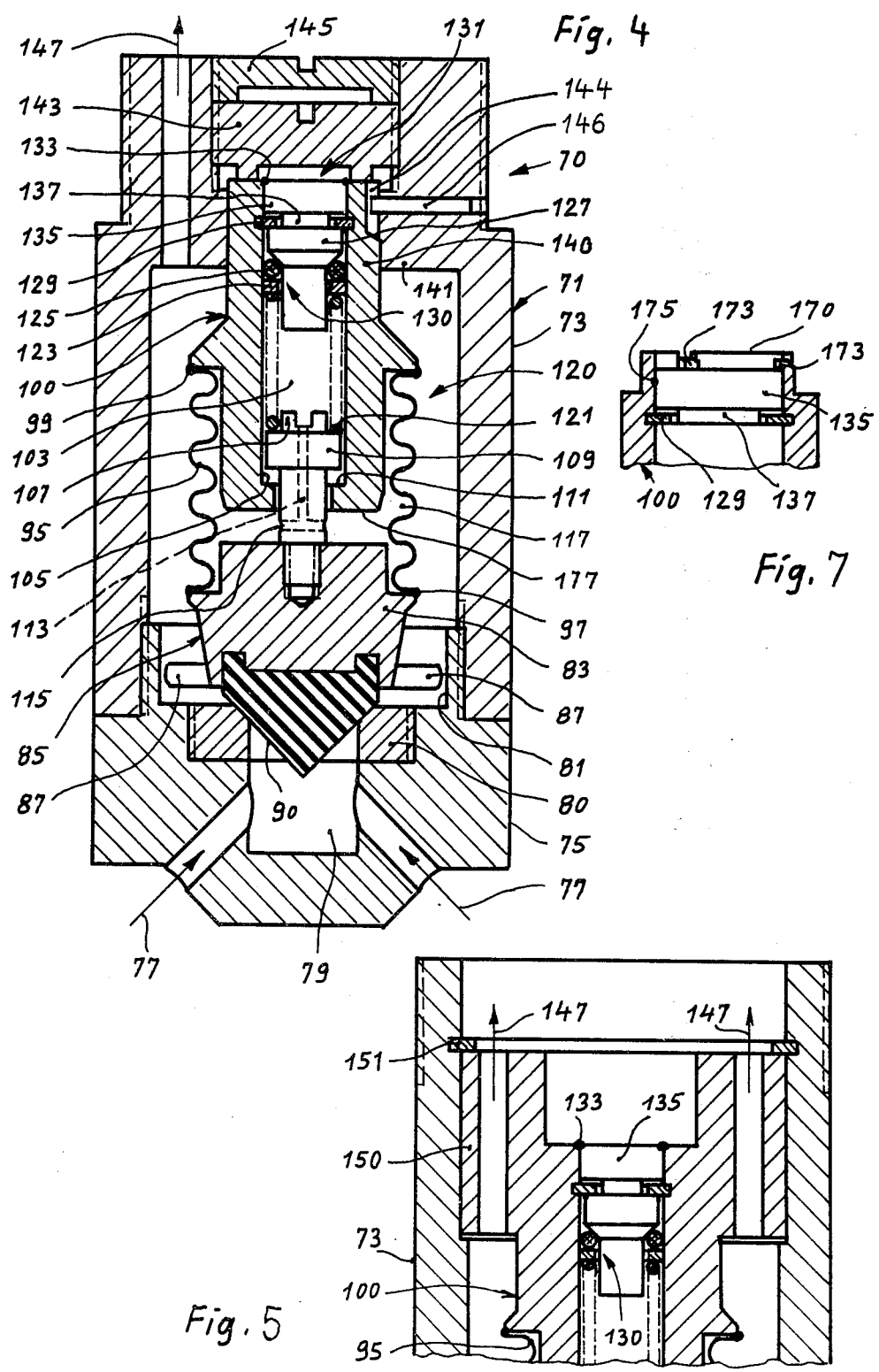

OVERPRESSURE VALVE FOR A HYDRAULIC PIT PROP

BACKGROUND OF THE INVENTION

The present invention relates to an overpressure valve for a hydraulic pit prop comprising a housing, a valve seat formed in the housing, a valve body movable in the housing between a closed position engaging the valve seat and an open position, and a gas cushion provided between the valve body and the housing and arranged to bias the valve body to the closed position.

In known overpressure valves of the aforementioned type (German Pat. No. 1,199,575 and German Offenlegungsschrift No. 1,583,109) the gas under pressure of the gas cushion diffuses after a certain period from its chamber, resulting in a drop of pressure of the gas cushion, which, in turn, results in a drop of the predetermined nominal loads of the pit props. In extreme cases this will result that the pit prop no longer has an adequate nominal load capacity.

SUMMARY OF THE INVENTION

It is an object of the invention to provide an overpressure valve of the above type which avoids the above-mentioned disadvantage of existing overpressure valves.

It is an additional object of the present invention to provide an overpressure valve of the aforementioned type which will act reliably over prolonged periods of time.

With these and other objects in view, which will become apparent as the description proceeds, the overpressure valve according to the present invention for a hydraulic pit prop, mainly comprises a housing, a valve seat formed in the housing, a valve body axially movable in the housing between a closed position, engaging the valve seat, and an open position, and means cooperating with the valve body for biasing the latter to the closed position and comprising bellows means filled with gas under pressure and fluid tightly sealed at opposite ends respectively relative to the housing and to the valve body. In view of the prevailing loads, a metal bellows is particularly suitable. After introduction of the gas under pressure into the bellows, the introduction aperture is closed in a gas-tight manner, for instance by welding, soldering or an adhesive in such a manner that diffusion of the gas from the bellows can no longer take place. Instead, the gas cushion will be maintained at its preset pressure virtually indefinitely, which in turn entails a constant thrust of the valve body body against the valve seat. The pressure relief valve in accordance with the present invention may for example be used as an operational valve or as a rock burst valve. The difference resides in the fact that, for an operational valve comparatively small volumes of hydraulic fluid have to be discharged from the interior of the prop comparatively frequently, whereas in the case of a rock burst valve, comparatively large volumes have to be discharged from the interior of the prop at comparatively rare occasions. The selection of the overpressure valve to be used, will depend on the structure of the rock prevailing at the site of employment of the pit prop.

In accordance with one feature of the invention, the interior of the bellows is adapted to be charged with a gas under pressure by way of a filling valve, the inlet of which is to be closed in a gas-tight manner, after the interior of the bellows has been filled with gas under pressure. In this way, the module of the overpressure valve which includes the bellows, may for example be accommodated in a space which subsequently is charged with the gas desired for the gas cushion. The pressure of the gas is increased in the space for so long until the desired charge pressure by way of the valve has also been attained in the bellows. The pressure in the surrounding space is subsequently lowered resulting in the immediate automatic closure of the filling valve. Immediately thereafter the inlet of the filling valve is closed in a gas-tight manner. The inlet may be closed by a cylindrical plug or by a conical plug. In the latter case it may be easier to reopen the inlet when required.

In accordance with a further feature of the present invention, a body which limits the opening stroke of the overpressure valve is provided inside the bellows. This prevents in a reliable manner an undersirable degree of deformation of the bellows, when the pressure relief valve is opened.

In accordance with a further feature of the present invention, one end of the bellows bears against a screw plug screwed into the housing and arranged coaxially with the bellows. Turning of the screw plug permits, on the one hand, by way of the limiting body an adjustment of the opening stroke of the overpressure valve, and, on the other hand, within certain limits, an adjustment of the gas pressure thrust of the overpressure valve. Following such an adjustment, the screw plug can be secured relative to the housing of the overpressure valve against accidental rotation in a manner known per se, for instance by a counter nut.

In accordance with an embodiment of the present invention the bellows is connected in a gas-tight manner to a terminal member which abuts in rotational relationship against the screw plug. This permits the installation and axial adjustment of the bellows without applying inadmissible torsional loads to the bellows. From a constructional point of view, it is particularly simple and advantageous in accordance with the present invention, to integrate the filling valve and inlet with the terminal member.

According to a further aspect, the invention provides also for the prolonged storage of a construction unit comprising the valve body, the bellows and the seal of the bellows at the side of the housing after the bellows is filled with gas under pressure and gas-tightly sealed, independent of the housing and the valve seat, without danger of diffusion losses.

In accordance with the invention, such a constructional unit comprises a device which restricts the expansion of the bellows in the axial direction. This limiting device during charging of the aforementioned unit with gas under pressure prevents an excessive and harmful expansion, in other words, overexpansion of the bellows in the axial direction. Accordingly, the unit can be disconnected and be charged with gas under pressure independently of the remainder of the overpressure valve, be closed in a gas-tight manner and be kept in stock ready for installation, without danger of diffusion losses. Thus it is made possible for a new overpressure valve to be equipped comparatively rapidly with such a premanufactured unit, and, on the other hand, any such unit, which may have become defective, can be replaced rapidly on the spot by a new premanufactured unit, without the necessity of removing the entire overpressure valve.

In accordance with an embodiment of the present invention, the limiting device may comprise a limiting member which coacts with a body which is connected in a gas-tight manner to one end of the bellows and with a stop member on the body, which limiting member is connected to the valve body. A particularly simple construction, which is moreover protected against external interference, results, when in accordance with the invention the body and the limiting member are at least in part arranged within the bellows and wherein the body is hollow and defines in the interior thereof a chamber into which a portion of the limiting member extends.

In accordance with a further feature of the invention, the limiting member is in the form of a screw, screwed into the valve body and comprising a flange which, inside the chamber, coacts with an abutment provided on the body.

In order to assure under all operational conditions a free and unimpeeded pressure equalization of the pressure gas in the interior of the aforementioned unit, passage means are provided in the limiting member for providing communication between the aforementioned chamber and the interior of the bellows. Such passage means may include at least one axial passage through the flange of the screw, or the screw may be provided with an axial bore ending in a cross-bore extending in a transverse direction through the screw upwardly of the threaded portion thereof.

In accordance with another embodiment of the invention, a surface of the body facing the valve body limits the opening stroke of the overpressure valve. Simple means are thus employed to avoid an excessive and harmful axial compression of the bellows.

A particularly space saving, protected construction results if, in accordance with the invention, the filling valve for the pressure gas forming the gas cushion with a gas-tightly closable inlet is arranged inside the aforementioned chamber.

In a preferred construction, the filling valve includes a sealing plunger and the arrangement further includes a sealing ring which coacts, on the one hand, with an inner surface of the wall forming the chamber and, on the other hand, with the sealing plunger, and spring means urging the sealing ring into sealing position.

In accordance with a further feature of the invention, the inlet of the filling valve is adapted to be closed in a gas-tight manner by means of a cylindrical plug, which, by bending over an adjoining edge of the body, may be positively locked against movement in axial direction. This bending over may be provided locally or along the entire edge of the body. This positive locking facilitates, after the introduction of the gas under pressure, a gas-tight adhesive connection between the cylindrical plug and the body, because the adhesive is permitted to harden without a danger that, during such hardening, the cylindrical plug, due to the pressure of the gas, moves axially in an outward direction, which would result in an undesirable pressure drop of the gas under pressure.

In accordance with a further feature of the present invention, means are provided on the housing for slidably guiding the body in axial direction relative to the housing, and a screw plug screwed into the housing abuts against a section of the body. In this manner it is possible after the installation of the aforementioned unit in the valve housing, to set rapidly and accurately the particular desired nominal load of the associated pit prop. The screw plug may for example be locked in its preset terminal position by means of a locking screw cap screwed into the same thread of the housing. In accordance with the invention the valve body and/or the valve seat may be prevented against turning relative to the housing by means of a key and groove arrangement.

In accordance with a further feature of the invention, the valve body may comprise a sealing member coacting with the valve seat and a pressure member abutting against the sealing member and being connected in a gas-tight manner to the bellows. Subdivision of the valve body may in appropriate cases permit the rapid and inexpensive replacement of a worn sealing member by a new one, without any changes having to be made to the remainder of the aforementioned unit.

An effective centering of the valve body inside the housing results when the pressure member or the sealing member is provided with means for slidably guiding the respective member in axial direction relative to the housing.

In accordance with a further feature of the invention, the sealing member and the pressure member are in mutual contact along a conical or spherical end face and are guided relative to one another in radial direction by a cylindrical projection provided on one of the members and engaging in a corresponding blind bore in the other of the members. In that manner the sealing member is movable within limits relative to the pressure member and may automatically adopt its optimal position relative to the valve seat in order to attain the most even pressure engagement of the surfaces along the entire sealing area of the valve seat.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a partial longitudinal section through a hydraulic pit prop provided with the overpressure valve according to the present invention;

FIG. 2 is a longitudinal section at an enlarged scale of the operating valve of the pit prop in accordance with FIG. 1 and comprising the pressure relief valve of the present invention;

FIG. 3 is a longitudinal cross-section through a modified detail of the overpressure valve shown in FIG. 2;

FIG. 4 is a longitudinal cross-section through another embodiment of the overpressure valve;

FIG. 5 is a longitudinal section through a modified portion of the overpressure valve shown in FIG. 4;

FIG. 7 is a cross-section of a modified detail of the pressure relief valve shown in FIG. 6.

DESCRIPTION OF THE PREFERRED EMBODIMENTS

Figure 6:
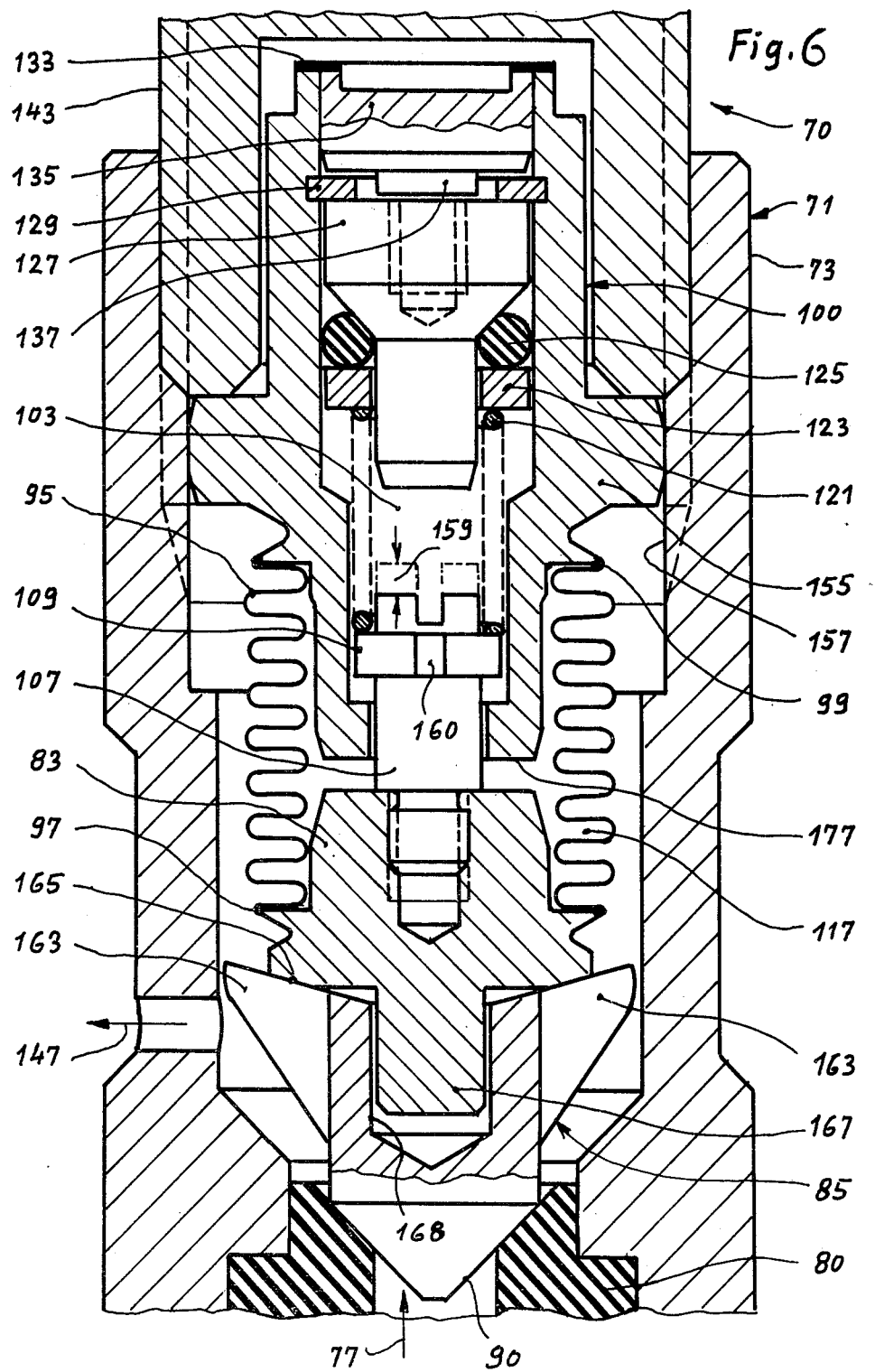
FIG. 6 is a longitudinal cross-section through a further embodiment of an overpressure valve according to the present invention.

FIG. 1 schematically illustrates a hydraulic pip prop 2, comprising an outer prop member 13 and an inner prop member 15 slidably arranged within the outer prop member. An operating valve 17 is installed adjacent the top of the inner prop member 15, extending transversely to the longitudinal axis of the pit prop.

FIG. 2 illustrates the operating valve 17 at a larger scale in longitudinal section. The operating valve 17 comprises an overpressure valve 20 and a combined valve 21 screwed to the former in coaxial relationship therewith. The combined valve 21 is composed of a setting valve 23 and a withdrawal valve 25. The unit composed of the valves 20, 23 and 25 is adapted to be displaced inside a casing tube 27 against the force of a spring 29 for the purpose of collapsing the pit prop. To this end a tool 19 is placed with a circular pocket 22 on a pin 24 supported by spaced side walls 26 connected to the casing tube 27. An eccentric cam surface 28 of the tool 19 rides against an end of said valve unit and axially displaces the latter while the tool 19 is being lifted for opening the withdrawal valve 25.

The overpressure valve 20 comprises a tubular housing 30 provided with one or more discharge apertures 33, each communicating with an axial passage 35, which in turn is in communication with the outside of the pit prop 10.

A valve seat 39 is press-fitted into an opening in a partition wall 37 extending transversely through the housing 30, the valve seat communicates through a passage 40 with the internal space 41 of the pit prop 10.

A valve body 43 coacts with the valve seat 39 and a bellows 45 is connected in a gas-tight manner to the rear side of the valve body 43. The other end of the bellows 45 is connected in a gas-tight manner to a terminal member 47 in which a filling valve 49 is provided having an inlet 50. The inlet 50 is gas-tightly closed by a cylindrical plug 53 soldered into the terminal member 47, after the interior of the bellows 45 has been filled with a gas under pressure.

The terminal member 47 abuts with its free end in rotatable relationship against a screw plug 55, screwed into a corresponding thread provided at the end of the housing 30.

A tubular body 57, firmly connected to the terminal member 47, projects in axial direction in the interior of the bellows 45 toward, but short of, the valve member 43. The gas pressure inside the bellows 45 maintains the valve member 43 with a predetermined pressure against its valve seat 39 so that a predetermined hydraulic pressure will be maintained in the pit prop 10, above which, for safety reasons, hydraulic fluid has to be discharged from the pit prop 10. If the hydraulic pressure in the interior of the pit prop 10 exceeds a predetermined pressure, the valve body 43 will be lifted off the valve seat 39, thus permitting discharge of hydraulic fluid from the interior 41 of the pit prop 10 through the passages 40, past the opened valve body 43, the discharge passage 33 and the axial passage 35. This causes the inner prop 15 to be retracted by a corresponding amount into the outer prop 13. While this happens, the tubular body 57 prevents the valve body 43 from being lifted off the valve seat 39 to such an extent that the bellows 45 will be deformed in an unacceptable manner. For this purpose, the rearwardly directed surface 59 of the valve body 43, comes into abutment with a free end of the body 57.

The conical configuration of the seat area of the valve body 43 and of the valve seat 39 will assure an automatic centering of the valve body 43 when the overpressure valve 20 is closed.

FIG. 3 illustrates a slight modification of the embodiment shown in FIG. 2, in that the inlet 50 in the terminal member 47 in FIG. 3 is closed by a threaded pin 63 having a conical end portion. The thread of the threaded pin 63 is rendered gas-tight in a suitable manner, for instance by means of an adhesive. This gas-tight sealing may be executed in such a manner that the threaded pin 63 may be unscrewed from the terminal member 47, if such is required.

FIG. 4 illustrates another embodiment of an overpressure valve 70, which comprises a housing 71 formed by a main body 73 and a cover 75 screwed into one end of the main body 73.

Pressure medium from the interior of the pit prop, excessive pressure of which is to be prevented by the overpressure valve 70, flows in the direction of arrows 77 through apertures in the cover 75 into a space 79 provided therein and limited in part by the valve seat 80 made of steel and screwed into the cover 75.

The cover 75 is further provided at its inner end with a cylindrical recess 81, the inner surface of which guides, in radial direction and with a tolerance, a plurality of projections 87 distributed over the outer periphery of the metallic pressure member 83 of a valve body 85. A substantially conical sealing member 90 of the valve body 85 is fitted into the pressure member 83 and coacts with the valve seat 80. The sealing member 90 is made of polyamide, e.g., a material known in the trade as "Ultramid".

A bellows 95, which, because of the forces to which it is subjected, is preferably in the form of a metal concertina bellows, is welded at one end along a weld seam 97 in gas-tight manner to the pressure member 83, and at its other end along a weld seam 99, in a gas-tight manner to a body 100.

The body 100 is hollow and defines a chamber 103 having an inner peripheral surface 105. A screw 107, screwed into the pressure member 83, extends with clearance through an opening provided in a bottom wall of the body 100 into the chamber 103 and is provided in this chamber with a flange 109 which coacts with an abutment 111 provided on the bottom wall of the body 100. A longitudinal passage 113 and a cross-passage 115 in communication therewith, inside the screw 107, provides for a continuous pressure equilibration of pressure gas which is contained in the chamber 103 and at the inner space 117 of the bellows 95, even when the bottom face of the flange 109 abuts against the abutment 111. This does not occur in the position of rest of the overpressure 70 as illustrated in FIG. 4, but only when a unit 120 of the overpressure valve 70 and comprising the valve body 85, the bellows 95, and the body 100 is preassembled outside of the remainder of the overpressure valve and charged with a gas under pressure. In that case the flange 109 will prevent a further axial expansion of the bellows 95 beyond the position in which the bottom face of the flange 109 bears against the abutment 111. In this manner excessive stretching of the bellows 95 can be avoided and the screw 107, therefore, forms limiting means for limiting axial expansion of the bellows. Moreover, the unit can be stored in its condition of pressurization with compressed gas in the absence of an external holding device until it is to be installed into the remainder of the overpressure valve 70.

A compression spring 121 is further provided in the chamber 103 and bears on the one hand, against the upper face of the flange 109 and on the other hand, against a ring 123. A sealing ring 125 is provided on the other side of the ring 123 and is adapted to seal the inner periphery 105 of the chamber 103 against a sealing plunger 127 accommodated with a lateral tolerance in the upper end of the chamber 103. The sealing plunger 127 bears against a locking ring 129 fitted in an annular groove provided in the inner periphery 105.

In this manner the inner periphery 105, the sealing plunger 127 and the sealing ring 125 coact to form a filling valve 130 for feeding compressed gas into the interior of the bellows 95 and during such feeding of compressed gas the sealing plunger 127 is downwardly displaced into the chamber 103, while the sealing ring 125 is displaced against the pressure of the spring 129 relative to the sealing plunger 127 so that compressed gas may pass between a clearance between the sealing ring 125 and the lower cylindrical portion of reduced diameter of the sealing plunger 127. After the interior of the bellows is thus filled with compressed gas, the inlet 131 of the filling valve is closed in a gas-tight manner by a cylindrical plug 135 welded along a weld seam 133 to the body 100. The cylindrical plug 135 comprises a cylindrical extension 137 which reduces the free volume of the chamber 103 between the sealing ring 125 and the weld seam 133. Accordingly, only very little compressed gas can diffuse past the sealing ring 125 toward the weld seam 133, so that the amount of pressure of the compressed gas, once set into the interior of the unit 120, is maintained virtually to its full extent.

The body 100 has a cylindrical portion 140 axially slidably mounted in a passage of the partition wall 141 of the main body 73 and bearing against a screw plug 143 screwed into the upper end of the main body 73. The gas pressure in the interior of the unit, and thereby the nominal load of the pit prop associated with the overpressure valve 70 is increased as the screw plug 143 is screwed further into the upper end of the main body 73. In its finally adjusted position, the screw plug 143 is locked by a locking screw cap 145, which is all the way screwed into the upper end of the main body. A rotation of the body 100 relative to the housing 71 is prevented by an axial groove 144 in the cylindrical portion 140 and a key 146 in the main body 73 and engaging the axial groove 144. A plurality of passages, only one of which is shown in FIG. 4, are further provided through the partition wall 141 and serve to discharge, in the direction of arrow 147, hydraulic fluid of the pit prop from the overpressure valve 70, which has passed between the valve seat 80 and the sealing member 90.

FIG. 5 illustrates a modification of the embodiment shown in FIG. 4, in which the body 100 comprises at its upper end a widened region 150, equivalent in function to the partition wall 141 shown in FIG. 4, and which bears against a locking ring 151, held in an annular groove of the main body 73 and which also comprises passages for the discharge of hydraulic fluid.

FIG. 6 illustrates a further embodiment of the overpressure valve according to the present invention, in which parts equivalent to those of the preceding Figures are indicated by the same reference numbers. In the embodiment shown in FIG. 6, the main body 73 is not provided with a partition wall corresponding to the partition wall 141 in FIG. 4. Instead the body 100 is provided with a flange 155 adapted to slide freely along the inner peripheral surface 157 of the main body 73 and to bear against a screw plug 143 which, in this case is directly screwed into a female thread of the main body.

The opening stroke of the valve body 85, and thereby that of the screw 107, is indicated in FIG. 6 at 159. In the embodiment shown in FIG. 6, the screw 107 is not provided with passages corresponding to the longitudinal passage 113 and the cross-passage 115 shown in FIG. 4. Instead the flange 109 comprises at least one axially directed passage 160 along its periphery for the purpose of permitting pressure equalization therethrough of the compressed gas between the chamber 103 and the inner chamber 117 defined by the bellows 95.

The sealing member 90 of the valve body 85 is provided with a plurality of radially outwardly extending projections 163 distributed about its periphery and guided in a radial direction with tolerance against the inner periphery 157 of the main body 73. The sealing member 90 in this case is made of steel, while the valve seat 80 is made of polyamide, e.g. the previously "Ultramid." The pressure member 83 and the projections 163 of the sealing member 90 are in contact along a conical annular area 165 designed to permit an easy automatic centering of the sealing member 90 relative to the valve seat. An extension 167 of the pressure member 83 projects with a slight lateral clearance into a blind bore 168 formed in the sealing member 90 to thus provide additional guidance for the pressure member 83 in radial direction relative to the sealing member 90.

FIG. 7 illustrates a slight modification of the embodiment shown in FIG. 6, in which a rim 170 of the body 100 projects in axial direction beyond the cylindrical plug 135. A plurality of tongues 173 distributed about the periphery of the rim 170 are inwardly bent into contact with the outer end face of the cylindrical plug 135 to thereby lock the cylindrical plug positively in the axial direction. As a result, an adhesive 175 introduced between the cylindrical plug 135 and the body 100 is permitted to set in a gas-tight manner, without the danger of relative displacement between the cylindrical plug 135 and the body 100.

In all embodiments in accordance with FIGS. 4–7, a surface 177 of the body 100 facing the valve body 85 limits the opening stroke of the overpressure valve 70.

It will be understood that each of the elements described above, or two or more together, may also find a useful application in other types of overpressure valves for hydraulic pit props, differing from the types described above.

While the invention has been illustrated and described as embodied in an overpressure valve for a hydraulic pit prop provided with a bellows filled with a gas under pressure arranged to press a valve body of the overpressure valve with a predetermined pressure against the valve seat thereof, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An overpressure valve for a hydraulic pit prop, comprising a housing; a valve seat formed in said housing; a valve body movable in said housing between a closed position engaging said valve seat and an open position; means cooperating with said valve body for biasing the latter to said closed position and comprising bellows means including a bellows having opposite ends and being filled with a gas under pressure, one of said opposite ends being gas-tightly connected to said valve body and a terminal member gas-tightly connected to the other end of said bellows; and a screw plug screwed into said housing and abutting against said terminal member.

2. An overpressure valve as defined in claim 1, and including a filling valve having an inlet for filling the interior of said bellows means with a gas under pressure, and means for gas-tightly closing said inlet after the interior of said bellows means has been filled with a gas under pressure, said filling valve with said inlet and said means for closing the latter being arranged in said terminal member.

3. An overpressure valve as defined in claim 2, wherein said means for gas-tightly closing said inlet comprises a cylindrical plug.

4. An overpressure valve as defined in claim 2, wherein said means for gas-tightly closing said inlet comprises a screw plug having a conical end portion sealingly engaging said inlet, the thread of said screw plug being gas-tightly sealed in such a manner so that the screw plug may be unscrewed if required.

5. An overpressure valve as defined in claim 2, including a body in the interior of said bellows means for limiting movement of said valve body away from said valve seat.

6. An overpressure valve as defined in claim 1, wherein said valve body comprises a sealing member cooperating with said valve seat and a pressure member abutting against the sealing member and gas-tightly connected to said bellows means.

7. An overpressure valve as defined in claim 6, and including means on said pressure member for guiding the latter movably relative to said housing in axial direction of said valve body.

8. An overpressure valve as defined in claim 6, and including means on said sealing member for guiding the latter movably relative to said housing in axial direction of said valve body.

9. An overpressure valve as defined in claim 6, wherein said members engage each other along annular surfaces, and wherein one of said members is provided with an axial blind bore and the other member with an axial extension projecting with small clearance into said blind bore.

10. An overpressure valve as defined in claim 9, wherein said annular surfaces are complementally conical surfaces.

11. An overpressure valve as defined in claim 9, wherein said annular surfaces are complementally spherical surfaces.

12. An overpressure valve as defined in claim 1, and including means for limiting axial expansion of said bellows means, said limiting means comprising a body gas-tightly connected to one end of said bellows means and formed with an abutment and a limiting member connected to said valve body and cooperating with said abutment.

13. An overpressure valve as defined in claim 12, wherein said body and said limiting member are at least in part arranged within said bellows means, wherein said body is hollow and defines in the interior thereof a chamber, and wherein said limiting member extends with a portion thereof into said chamber.

14. An overpressure valve as defined in claim 13, and including passage means in said limiting member for providing communication between said chamber and the interior of said bellows means.

15. An overpressure valve as defined in claim 14, and including a filling valve in said chamber for filling the interior of said bellows means with a gas under pressure, said filling valve having an inlet, and means for gas-tightly closing said inlet after the interior of said bellows means has been filled with a gas under pressure.

16. An overpressure valve as defined in claim 15, wherein said filling valve includes a sealing plunger, a sealing ring between said sealing plunger and the inner surface of said body defining said chamber, and spring means for urging said sealing ring into sealing position tightly engaging said inner surface and said plunger.

17. An overpressure valve as defined in claim 15, wherein said means for gas-tightly closing the inlet comprises a cylindrical plug inserted and sealed into one end of said hollow body, and inwardly extending tongues on said one end of said hollow body and engaging said plug for preventing movement of the latter out of said one end.

18. An overpressure valve as defined in claim 13, wherein said limiting member is constituted by a screw screwed into said valve body, said screw including a collar provided on said portion of said limiting member and cooperating with said abutment.

19. An overpressure valve as defined in claim 18, wherein said collar is formed with at least one passage extending in axial direction therethrough.

20. An overpressure valve as defined in claim 12, and including means on said housing for guiding said body movably in axial direction.

21. An overpressure valve as defined in claim 20, and including means for preventing turning of said body about its axis.

22. An overpressure valve as defined in claim 21, wherein said turning preventing means comprises an axial groove and a pin engaged in said groove respectively provided in said body and said housing.

* * * * *